US012807515B2

(12) United States Patent
Rajasekharan et al.

(10) Patent No.: US 12,807,515 B2
(45) Date of Patent: Nov. 24, 2026

(54) METHODS AND CONTROLLER FOR DETERMINING HYDROGEN SULFIDE TREATMENT DOSAGE

(71) Applicant: HACH COMPANY, Loveland, CO (US)

(72) Inventors: Vishnu Rajasekharan, Fort Collins, CO (US); Matthew Gray, Lafayette Hill, PA (US); Russell Young, Loveland, CO (US)

(73) Assignee: HACH COMPANY, Loveland, CO (US)

( * ) Notice: Subject to any disclaimer, the term of this patent is extended or adjusted under 35 U.S.C. 154(b) by 551 days.

(21) Appl. No.: 18/377,587

(22) Filed: Oct. 6, 2023

(65) Prior Publication Data

US 2025/0115493 A1 Apr. 10, 2025

(51) Int. Cl.

*C02F 1/68* (2023.01)
*C02F 1/00* (2023.01)
*C02F 101/10* (2006.01)

(52) U.S. Cl.

CPC ................ *C02F 1/008* (2013.01); *C02F 1/68* (2013.01); *C02F 2101/101* (2013.01); *C02F 2209/26* (2013.01); *C02F 2209/265* (2013.01)

(58) Field of Classification Search

CPC ...... C02F 1/008; C02F 1/68; C02F 2101/101; C02F 2203/02; C02F 2209/001; C02F 2209/005; C02F 2209/26; C02F 2209/265

See application file for complete search history.

(56) References Cited

U.S. PATENT DOCUMENTS 5,587,926 A 12/1996 Chiu
7,273,561 B1 9/2007 Palmer
2007/0259416 A1 * 11/2007 Parker .................... B01D 53/84 435/266

FOREIGN PATENT DOCUMENTS

WO 2021/163395 A1 8/2021

OTHER PUBLICATIONS

Yongsiri et al.; "Effect of Temperature on Air-Water Transfer of Hydrogen Sulfide;" Journal of Environmental Engineering; vol. 130, No. 1; Jan. 1, 2004; pp. 104-109.

(Continued)

*Primary Examiner* — Bradley R Spies
(74) *Attorney, Agent, or Firm* — Oliff PLC

(57) ABSTRACT

A method for controlling a hydrogen sulfide concentration of a wastewater stream, the method including measuring a hydrogen sulfide concentration in one phase of the wastewater stream. At least one additional parameter of the wastewater stream is measured, and a hydrogen sulfide concentration of the other phase of the wastewater stream is calculated with a mathematical model that characterizes the hydrogen sulfide concentration in the other phase based on a set of variables that includes the measured hydrogen sulfide concentration in the one phase and the measured at least one additional parameter. Based on the calculated hydrogen sulfide concentration of the other phase, a treatment dosage of a treatment agent that reduces the hydrogen sulfide concentration of the wastewater stream is determined and applied to the wastewater stream.

14 Claims, 4 Drawing Sheets

(56) References Cited

OTHER PUBLICATIONS

R. Sander; "Compilation of Henry's law constants (version 4.0) for water as solvent;" Atmospheric Chemistry and Physics; vol. 15; Apr. 30, 2015; pp. 4399-4981.
Richard D. Pomeroy et al.; "The Forecasting of Sulfide Build-Up Rates in Sewers;" Proceedings of the 8th International Conference; Sydney, Australia 1978; 621-628; Abstract only.

* cited by examiner

METHODS AND CONTROLLER FOR DETERMINING HYDROGEN SULFIDE TREATMENT DOSAGE

BACKGROUND

Hydrogen sulfide ($H_2S$) is a major concern in sewer networks. It is a malodorous, highly toxic gas with the characteristic smell of rotten eggs, and it is corrosive to concrete and metal.

Hydrogen sulfide's effects are noticeable when released in the gas phase, for example at concentrations of >0.5 ppm. When released into the atmosphere, for example in a sewer or urban area, $H_2S$ causes unpleasant and strong malodors. At higher concentrations, $H_2S$ can be lethal.

A chemical treatment, such as ferric chloride, bioxide, or hydrogen peroxide, is often applied to the wastewater stream to reduce or control $H_2S$. A lack of predictability and certainty in the $H_2S$ concentration may lead to an under treatment or over treatment of the wastewater stream. Over treating the system with too much chemical treatment agent can unnecessarily increase costs associated with excess treatment agent and its removal from the water stream. On the other hand, if an insufficient amount of the chemical treatment agent is added, $H_2S$ concentrations become high in manhole areas and $H_2S$ scrubbing systems which can cause customer complaints due to odors, creates health risks, and causes equipment failure due to corrosion. More accurate treatments of the wastewater stream would result in less corrosion of the wastewater stream including infrastructure such as pipes and concrete, less odor, and less downtime and maintenance of sensors and $H_2S$ scrubbers.

Monitoring of a wastewater stream atmosphere for $H_2S$ is often challenging because of the harsh environment, associated with high humidity and toxicity. Because of the harsh environment and corrosive conditions, calibration and maintenance of the $H_2S$ sensors and equipment are frequently needed, especially gas phase $H_2S$ sensors. As such, sensors are often taken offline or rotated at regular intervals for service, maintenance, or refreshment periods as recommended by the manufacturer.

When a sensor is taken offline, there is a period of time where a measurement of $H_2S$ in one phase is not available. Thus, an effective amount of chemical treatment of the wastewater is not known. The wastewater is then often under treated or over treated with the chemical treatment.

In addition, when the sensor is taken offline and the measurement of $H_2S$ in one phase is not available, it is difficult to accurately predict a downtime or a maintenance schedule of a $H_2S$ gas scrubber configured to remove $H_2S$ from the wastewater stream and other sensors and equipment in the wastewater system. This can lead to unexpected breakdowns or maintenance of the $H_2S$ gas scrubber or other sensors and equipment.

Accordingly, there remains a need for improved devices, methods, or systems that provide accurate $H_2S$ predictions for one phase, such as when a sensor is not available to determine the $H_2S$ concentration in that phase, and can implement an optimal amount of treatment for reducing $H_2S$.

SUMMARY

In one aspect, this disclosure provides a method and controller for determining $H_2S$ treatment dosage that reduces or eliminates these drawbacks.

In one aspect, this disclosure provides a method for controlling a $H_2S$ concentration of a wastewater stream, the method comprising measuring, with a sensor, a $H_2S$ concentration in one phase of the wastewater stream, including either (i) a liquid phase concentration of $H_2S$ of the wastewater stream or (ii) a gas phase concentration of $H_2S$ of the wastewater stream, measuring, with a sensor, at least one additional parameter of the wastewater stream, calculating a $H_2S$ concentration of the other phase of the wastewater stream with a mathematical model that characterizes the $H_2S$ concentration in the other phase based on a set of variables that includes (i) the measured $H_2S$ concentration in the one phase and (ii) the measured at least one additional parameter, based on the calculated $H_2S$ concentration of the other phase, determining a treatment dosage of a treatment agent that reduces the $H_2S$ concentration of the wastewater stream, and applying the determined treatment dosage of the treatment agent to the wastewater stream.

In another aspect, this disclosure provides a method for controlling a $H_2S$ concentration of a wastewater stream, the method comprising measuring, with a sensor, a $H_2S$ concentration in one phase of the wastewater stream, including either (i) a liquid phase concentration of $H_2S$ of the wastewater stream or (ii) a gas phase concentration of $H_2S$ of the wastewater stream, measuring, with a sensor, at least one additional parameter of the wastewater stream, calculating a $H_2S$ concentration of the other phase of the wastewater stream with a mathematical model that characterizes the $H_2S$ concentration in the other phase based on a set of variables that includes (i) the measured $H_2S$ concentration in the one phase and (ii) the measured at least one additional parameter, and based on the calculated $H_2S$ concentration, taking at least one corrective action on a $H_2S$ gas scrubber that is configured to remove H2S from the wastewater stream.

In another aspect, this disclosure provides a controller for controlling a $H_2S$ concentration of a wastewater stream, the controller including at least one processor that is configured to (i) receive signals indicative of a measured $H_2S$ concentration in one phase of the wastewater stream, including either (i) a liquid phase concentration of $H_2S$ of the wastewater stream or (ii) a gas phase concentration of $H_2S$ of the wastewater stream, (ii) receive signals indicative of at least one additional measured parameter of the wastewater stream, and (iii) calculate a $H_2S$ concentration of the other phase of the wastewater stream with a mathematical model that characterizes the $H_2S$ concentration in the other phase based on a set of variables that includes (i) the measured $H_2S$ concentration in the one phase and (ii) the measured at least one additional parameter.

DETAILED DESCRIPTION OF EMBODIMENTS

Figure 1:
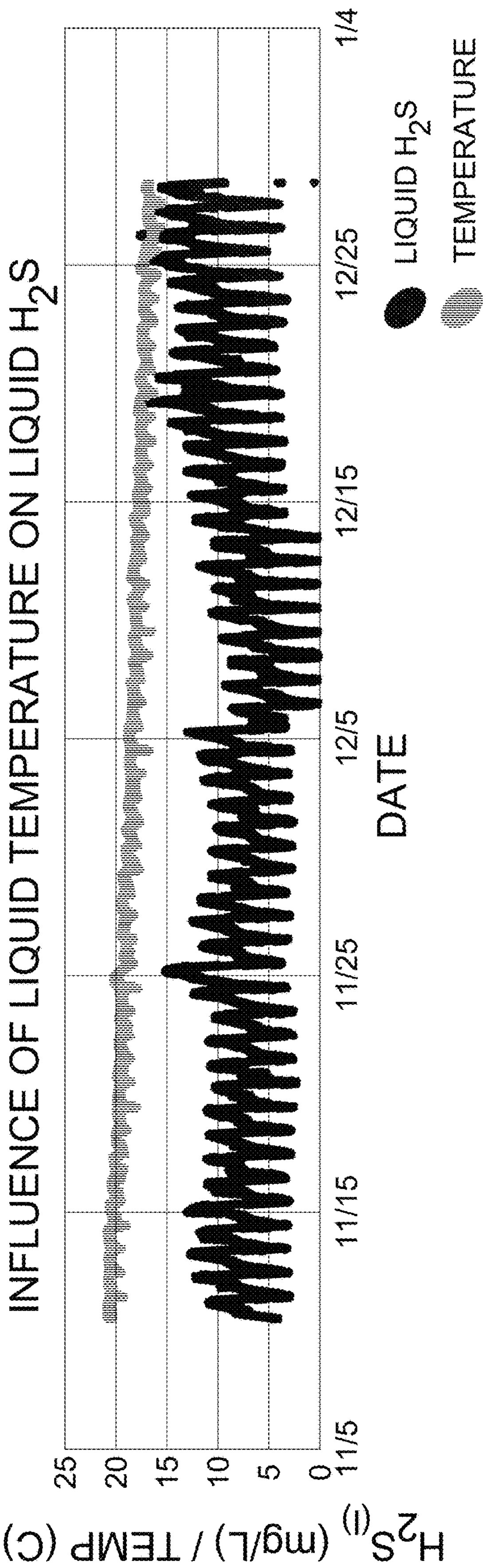
FIG. 1 is a graph depicting an empirical relationship between a temperature of a wastewater stream and a concentration $H_2S(l)$ in a liquid phase of the wastewater stream.

In the following description, numerous details are set forth to provide an understanding of the present disclosure.

However, it may be understood by those skilled in the art that the methods and systems of the present disclosure may be practiced without these details and that numerous variations or modifications from the described embodiments may be possible.

In a wastewater stream, $H_2S$ is formed in the liquid phase under anaerobic conditions when sulfate is biologically reduced by anaerobic bacteria (e.g., *Desulfovibrio*) to sulfide. The following equations may represent the generation of $H_2S$ from sulfate and anaerobic bacteria.

$$SO_4^{2-} + \text{organic matter} + \text{anaerobic bacteria} \rightarrow S_2^- + H_2O + CO_2S_2^- + 2H^+ \rightarrow H_2S$$

As used herein, wastewater may include but is not limited to water including municipal wastewater, industrial wastewater, wastewater sludge, sewage, contaminated water, and/or polluted water.

Disclosed herein are methods, systems, and devices for determining an optimal dosage amount of treatment to be added to a wastewater stream or wastewater system to reduce or remove $H_2S$. For example, the disclosed embodiments determine the optimal or smallest effective amount of treatment for achieving a desired amount of $H_2S$ in a wastewater stream by using at least one measured wastewater parameter, a measured concentration of $H_2S$ in either the liquid phase or the gaseous phase of the wastewater stream, and at least one mathematical model that calculates the $H_2S$ concentration in the other of either the liquid phase or the gaseous phase of the wastewater stream based on the at least one measured wastewater parameter. As explained below, the mathematical model can be a deterministic model, a data analytics model, or a combination of both of these models.

Embodiments of the invention can overcome drawbacks of the prior art by employing techniques to continuously or periodically determine the optimal dosage for meeting the treatment goal. The disclosed embodiments can use a measured value of $H_2S$ in one phase, other measured parameters of a wastewater stream, and theoretical and/or empirical relationships to determine a predicted $H_2S$ content in the other phase. The calculated $H_2S$ content can then be used to calculate the optimal treatment dosage of the chemical treatment agent. The calculated $H_2S$ content can also be used to determine downtime or a maintenance schedule of a $H_2S$ gas scrubber configured to remove $H_2S$ from the wastewater stream or to determine maintenance schedules for other sensors or equipment in the wastewater system.

In some embodiments, the $H_2S$ content is only measured in the one phase. Accordingly, the $H_2S$ content in the other phase can be determined when a sensor for the $H_2S$ content in the other phase is offline or otherwise unavailable.

As explained below, embodiments of the invention can reduce waste and costs as compared to prior methods and devices that administer excess treatment or not enough treatment to the wastewater and that are not able to accurately predict downtime or a maintenance schedule of the $H_2S$ gas scrubbers or monitoring equipment.

Deterministic Model

A deterministic mathematical model may utilize a measured value of $H_2S$ content in one phase (either $H_2S$(l) or (g)), other measured parameters or variables that impact a concentration of $H_2S$ in the other phase, and a theoretical relationship of those parameters to a concentration of $H_2S$ in the other phase to calculate the predicted $H_2S$ in the other phase. For example, if a system has a functioning $H_2S$ sensor in the liquid phase, the amount of $H_2S$(l) can be directly measured, and the amount of $H_2S$(g) can be calculated based on (i) the measured value of $H_2S$(l); (ii) other measured parameters or variables of the system and/or environment that affect the value of $H_2S$(g); and (iii) a mathematical model that calculates $H_2S$(g) based on these variables. Alternatively, the concentration of $H_2S$(g) may be measured and $H_2S$(l) may be calculated.

The first variable of the mathematical model is the measured amount of $H_2S$ in one phase of the system, i.e., either $H_2S$(l) or $H_2S$(g). Thus, in using embodiments of the invention, the wastewater system will have at least one working sensor in one phase that can output signals that are indicative of the $H_2S$ amount in that phase. $H_2S$(l) may be measured in mg/L and $H_2S$(g) may be measured in ppm, for example.

Apart from the measured amount of $H_2S$ in one phase, there are several parameters of the system and/or environment that can be measured and used to predict the $H_2S$ in the other phase. In embodiments, the mathematical model may use only one such parameter, but typically uses a plurality of the parameters such as from 2 to 8 or from 3 to 5, for example. As will be evident form the description below, these parameters can be measured parameters of the wastewater stream or its surrounding environment that can be measured with sensors in real time (e.g., including probes) and/or parameters of the wastewater stream that are known by being previously calculated or determined (e.g., physical parameters of the wastewater stream such as the slope, or possibly average velocity of the stream or hydraulic depth of the stream).

One measured parameter may be a temperature of the wastewater. The relationship between $H_2S$(l) in the wastewater and $H_2S$(g) may be dependent on temperature via an Arrhenius relationship. For example, the relationship may be expressed by: $H_2S(l)=C_1f(T)*H_2S(g)$ where $C_1$ is a coefficient and f(T) is function of temperature.

One measured parameter may be a pH of the wastewater. The concentration of $H_2S$(l) in the wastewater may be dependent on the pH. For example, the pH may affect the disassociation of $H_2S$ into its ions, $HS^-$ and $S^{2-}$, and the respective concentrations of $HS^-$ and $S^{2-}$ may be functions of pH and the concentration of $H_2S$(l). Thus, a sum of total sulfide in the wastewater may be expressed as: Total Sulfide Concentration$=H_2S(l)+H_2S(l)*f_1(pH)+H_2S(l)*f_2(pH)$ where $f_1(pH)$ is $10^{pH-6.7}$ and $f_2(pH)$ is $10^{pH-12.90}$.

The parameters of temperature and pH may be combined for a more accurate or robust model and expressed as: $H_2S(g)=C_2(H_2S(l)+H_2S(l)*f_1(pH)+H_2S(l)*f_2(pH))/C_1f(T)$ where $C_2$ is a constant.

Various other parameters of the system that affect $H_2S$ can be used in the deterministic model. Examples of such parameters include a measured parameter such as biochemical oxygen demand ("BOD"), a physical parameter of the system such as the slope of the wastewater in the system ("S"), a mean velocity of the wastewater in the system ("V"), and a hydraulic depth ("$d_m$") which is a cross sectional area of the flow divided by the flow width. BOD may be measured in mg/L. S may be measured in m/m and measured from a pump from a wet well lift station to a discharge of a force main, i.e. across the force main. V may be measured in $m/s^{-1}$ and may be measured at the discharge of the force main. $d_m$ may be measured in m.

The physical parameters of the system, velocity of the wastewater in the system, and the measurement of organic parameters in the wastewater may be expressed as: $H_2S$(l)

$=C_3f(BOD)*f_1(T)-C_4f(S,V)*H_2S(l)*f(d_m)$ where $C_3$ and $C_4$ are constants, f(BOD) is a function of BOD, $f_1(T)$ is a function of T, f(S,V) is a function of S and V, and $f(d_m)$ is a function of $d_m$.

These parameters may be combined with the temperature and pH for a more accurate or robust model and expressed as: $H_2S(g)=C_2*(C_3f(BOD)*f_1(T)-C_4f(S,V)*H_2S(l)*f(d_m))*(1+f_1(pH)+f_2(pH))/C_1f(T)$.

A measured parameter of the wastewater stream may include a parameter of the air or atmosphere above the wastewater stream. Any parameters measured may be measured at any location or point in the wastewater system including at the wet well lift station, at the force main, or at a discharge of the force main.

Data Analytics Model

A data analytics model can utilize empirical relationships of parameters or variables that impact a concentration of $H_2S(l)$ or $H_2S(g)$, and a measured concentration of $H_2S$ in one phase to calculate a concentration of $H_2S$ in the other phase. For example, if a system has a functioning $H_2S$ sensor in the liquid phase, the amount of $H_2S(l)$ can be directly measured, and the amount of $H_2S(g)$ can be calculated based on (i) the measured value of $H_2S(l)$; (ii) other measured parameters or variables of the system and/or environment that affect the value of $H_2S(g)$; and (iii) empirical relationships between the other measured parameters or variables and the amount of $H_2S(g)$. Alternatively, the concentration of $H_2S(g)$ may be measured and $H_2S(l)$ may be calculated.

Empirical data shows that the release of $H_2S$ into the atmosphere from the wastewater stream is dependent on various wastewater quality parameters. The primary parameters are $H_2S(l)$, pH of the wastewater, a flow rate of the wastewater, temperature of the wastewater, and a concentration of a $H_2S$ treatment agent (e.g., quencher) in the wastewater, for example $FeCl_3$. Secondary parameters include an oxygen concentration in the wastewater and a sulfate concentration in the wastewater. Each parameter may have varying degrees of impact on the $H_2S(g)$. Additional parameters may include but are not limited to, for example, nitrate concentration of the wastewater, a conductivity of the wastewater, a hardness of the wastewater, oxidation-reduction potential, a $SO_4$ concentration of the wastewater, an alkalinity of the wastewater, a location of the sensors, a wind speed of the atmosphere above the wastewater, a distance between $H_2S(g)$ and $H_2S(l)$ sensors, turbidity of the wastewater, a total organic carbon content of the wastewater, an ultraviolet adsorption of the wastewater (UV254), a total suspended solids content of the wastewater, a zeta potential, vapor pressure of the wastewater, and a temperature of the air above the wastewater stream. In addition to the measured concentration of $H_2S$ in one phase, the data analytics model may use one or a plurality of additional parameters such as from 2 to 30, from 2 to 8 or from 3 to 5, for example. These parameters can be measured parameters of the wastewater stream or its surrounding environment that can be measured with sensors in real time (e.g., including probes) and/or parameters of the wastewater stream that are known by being previously calculated or determined.

The data analytics model may quantify the $H_2S(g)$ or $H_2S(l)$ by using a combination of parameters with weighting coefficients depending on the impact of each parameter. In the model for calculating $H_2S(g)$ amounts, the $H_2S(l)$ typically has the highest impact on the $H_2S(g)$, followed by temperature of the wastewater, pH of the wastewater, flow rate of the wastewater, and the concentration of a $H_2S$ quencher in the wastewater. The degree of impact on $H_2S(g)$ by each parameter can be weighted with a coefficient in the mathematical model. Variables or parameters may be included to increase the robustness of the model.

The data analytics model may be expressed generally as $y=X\beta+\varepsilon$ where y is a target variable to be predicted/measured, X is a predictor (a quantity of a measured variable), β is a weighted coefficient of a corresponding a predictor, and e denotes the next predictor and coefficient that may be utilized in the equation. For example, the data analytics model may be expressed as:

$$\begin{aligned} H2S(g) = {} & \beta_1(\text{pH}(X1)) + \beta_2(H2S(l)(X2)) + \beta_3(\text{Flow}(X3)) + \\ & \beta_4(Temp(X4)) + \beta_5(\text{Flow}(X5)) + \beta_6(\text{Turbidity}(X6)) + \\ & \beta_7(TOC(X7)) + \beta_8(UV254(X8)) + \beta_9(TSS(X9)) + \\ & \beta_{10}(\text{Zeta Potential}(X10)) + \beta_{11}(H2S\text{ quencher }(\text{FeCl3}(X11)) + \\ & \beta_{12}(\text{Nitrate}(X12)) + \beta_{13}(\text{Conductvity}(X13)) + \\ & \beta_{14}(\text{Hardness}(X14)) + \beta_{15}(ORP(X15)) + (+\beta_{16}(\beta_{17}(\text{SO4}(X17)) + \\ & \beta_{18}(\text{Akalinity}(X18)) + \beta_{19}(\text{Location}(X19) + \beta_{20}(\text{Windspeed}(X18) + \\ & \beta_{21}(\text{Distance between } H2S(\text{g})\text{ to } H2S(l)(X18) +)))))) \end{aligned}$$

or $$y = (\beta_1, \beta_2, \beta_3, \beta_4\ \ldots\ \beta_{18}) \cdot \begin{pmatrix} \text{pH} \\ H2S(l) \\ Temp\ \ldots \end{pmatrix}.$$

In the above equation, X represents a measured quantity of the preceding parameter, e.g. $X_1$ represents a measured quantity of pH, $X_2$ represents a measured quantity of $H_2S(l)$, etc. $X_3$ flow may represent a measured quantity of an uphill flow, such as an uphill flow rate, and $X_5$ flow may represent a measured quantity of a downhill flow, such as a downhill flow rate. A coefficient β may be determined by a correlation of the corresponding predictor X to the target variable y. For example, empirical data may be utilized to determine the coefficient β for each variable X by a comparison of empirical data for X to a concentration of $H_2S$.

The above equation may serve as a foundation for the data analytics mode and may be manipulated, for example, depending on the availability of measurements of specific parameters, the weight of coefficients for a specific system, or the measured quantity of a parameter in the specific system. For example, a variable may be removed from the equation if a measurement of the variable is not available for a specific system (i.e. there is no sensor available to measure the parameter at a facility or site) or the contribution of that variable and/or its coefficient in relationship to the concentration of $H_2S(g)$ is determined to be negligible in the specific system.

Figure 2:
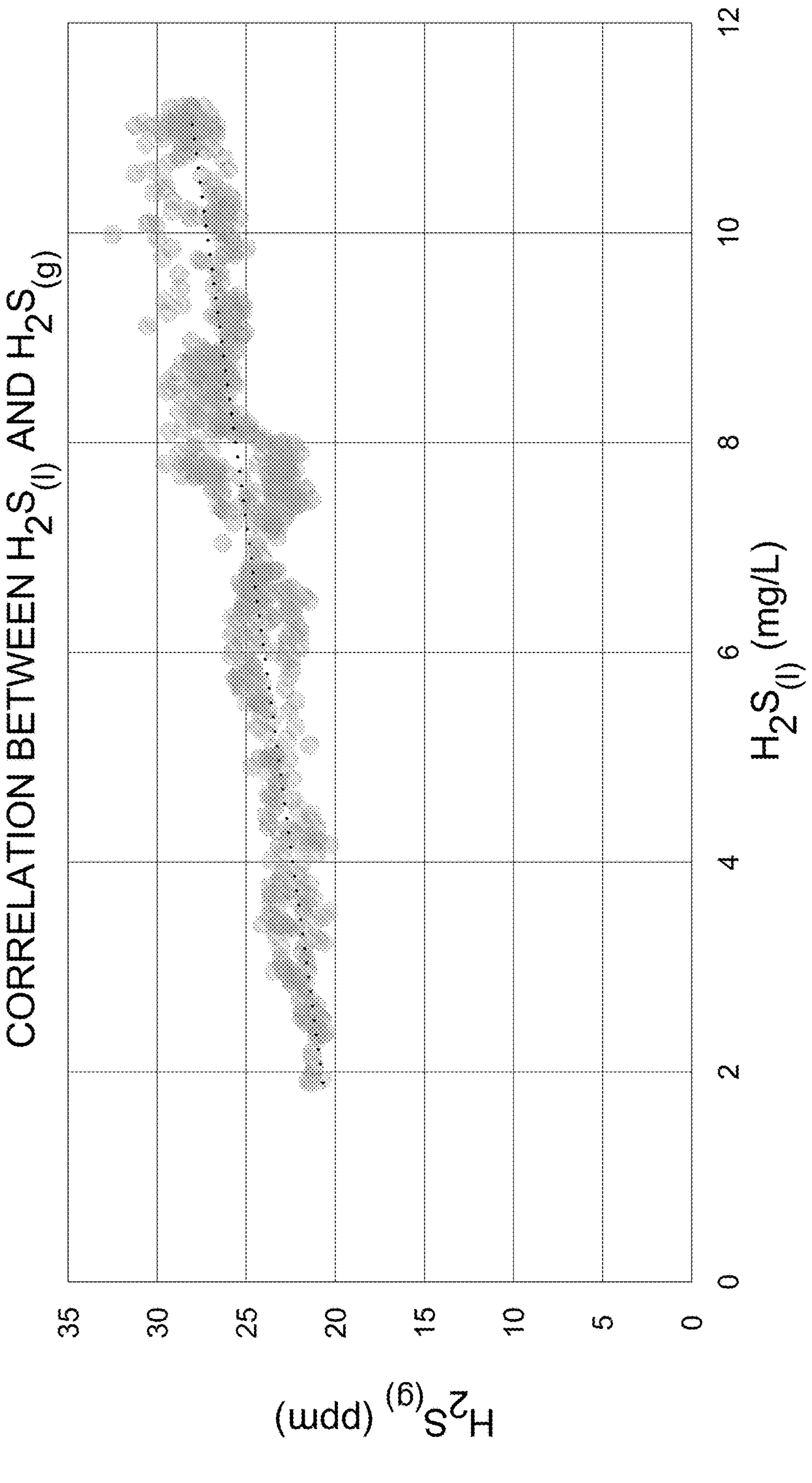
FIG. 2 is a graph depicting an empirical relationship between a concentration $H_2S(g)$ in a gaseous phase above the wastewater stream and a concentration $H_2S(l)$ in the liquid phase of the wastewater stream.

FIGS. 1 and 2 are examples of empirical relationships that may be utilized in the data analytics approach to determine a coefficient β for a corresponding predictor X. An example of an empirical relationship between a temperature of the wastewater stream and concentration of $H_2S(l)$ is seen in FIG. 1. The temperature of the wastewater stream is measured in Celsius and the concentration of $H_2S(l)$ is measured in mg/L. The graph depicts the empirical, measured relationship between the two parameters at various dates in a certain system. As shown in FIG. 1, as the temperature decreases, generally $H_2S(l)$ increases. Accordingly, the empirical data of FIG. 1 may be used to determine a coefficient β for the parameter of temperature for the target variable of $H_2S(l)$.

FIG. 2 depicts an empirical relationship between a concentration of $H_2S(g)$ measured in ppm and a concentration of $H_2S(l)$ measured in mg/L. As shown in FIG. 2, as $H_2S(l)$ increases, generally $H_2S(g)$ increases. Accordingly, the empirical data of FIG. 2 may be used to determine a coefficient β for the parameter of $H_2S(l)$ for the target variable of $H_2S(g)$.

Other empirical relationships can be determined for various other system variables. Depending on the variable, the empirical relationships can be determined at each facility/site, or possibly certain empirical relationships would be applicable between sites. Thus, the coefficient β for each predictor X may be dependent upon the facility/site of the system.

Combined Model

The mathematical models may be used independently or in conjunction with each other for greater accuracy or to minimize error. In one embodiment, the data analytics mathematical model may compensate or supplement the deterministic mathematical model by including empirical relationships between the parameters or variables for a more accurate prediction or determination of $H_2S$ concentration. For example, the deterministic model may be used to calculate a $H_2S$ concentration in one phase of the wastewater system. A coefficient or constant used in the deterministic model may then be weighted with a coefficient β of the data analytics model for the corresponding calculated variable. Alternatively or in addition, measured parameters not initially included in the deterministic model may be added to the deterministic model with the corresponding coefficient β as used in the data analytics model. For example, a specific parameter may not be utilized by the data analytics model. Accordingly, a measured value of that specific parameter may be weighted by its corresponding coefficient β from the data analytics model. The result may be added to the deterministic model for a more accurate determination of the $H_2S$ concentration.

In another embodiment, the deterministic mathematical model may compensate or supplement the data analytics mathematical model by including theoretical relationships between the parameters or variables for a more accurate prediction or determination of $H_2S$ concentration. For example, the data analytics model may be used to calculate a $H_2S$ concentration in one phase of the wastewater system. An unmeasured parameter may then be calculated by the deterministic model and a calculated value of that unmeasured parameter may then be included in the data analytics model and weighted with the corresponding coefficient of the data analytics model. Alternatively or in addition, a calculated value of a parameter of the deterministic model may be substituted for a measured parameter of the data analytics model.

Automated $H_2S$ Treatment Dosing System

Figure 3:
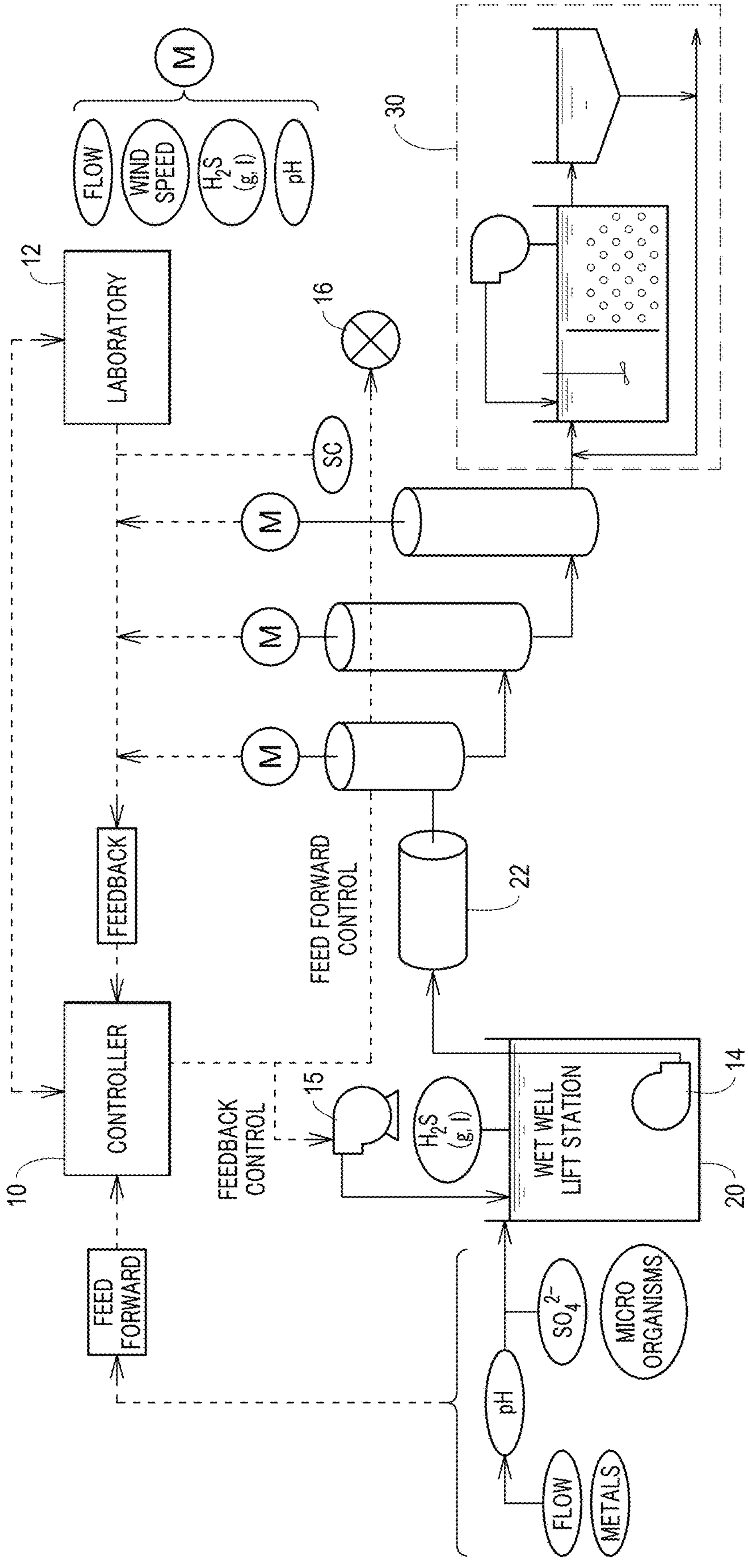
FIG. 3 is a schematic diagram of a $H_2S$ treatment system.

FIG. 3 depicts a controller 10 in communication with a supply pump 15. The supply pump 15 administers a treatment, such as ferric chloride, hydrogen peroxide, bioxide, or other $H_2S$ quenching agents at a wet well lift station 20. The wet well lift station 20 may be at or near the lowest topographical point in the wastewater system. At the wet well lift station 20, a pump 14 pumps the wastewater through a force main 22 to a higher elevation where it is discharged from the force main 22 into an open channel collection system at a point that is near the highest topographical point in the wastewater system. The wastewater then flows downstream towards a treatment plant 30 passing a series of manholes M.

Using methods described herein, treatment of the wastewater stream is controlled, i.e., adjusted and optimized using measured parameters and a mathematical model, by the controller 10 to increase overall efficiency and reduce costs. According to an embodiment, the treatment can be precisely and accurately controlled via the controller 10 by sending control signals to the supply pump 15.

Various control mechanisms can be used in connection with one or more of the above-described mathematical models to accurately control the dosage of the treatment agent, including a feed forward control loop and a feedback control loop, e.g. as shown in FIG. 3.

Feed forward parameter(s) may be measured on-line, upstream of the wet well lift station 20. For example, as shown in FIG. 3, measured parameters may include a pH of the wastewater stream, a flow of the wastewater stream, an $SO_4^{2-}$ concentration of the wastewater stream, a content of metals in the wastewater stream, and a content of microorganisms in the wastewater stream. In addition, in FIG. 3 a concentration of $H_2S(g)$ or $H_2S(l)$ is measured at the wet well lift station 20.

The measured feed forward parameter(s) can be evaluated to adjust the treatment dosage. For example, the controller 10, which is configured to receive the measured feed forward parameter(s), can be configured to evaluate the measured parameter(s) by the deterministic mathematical model, the data analytics mathematical model, or a combination thereof and calculate a $H_2S$ concentration. Then controller may calculate a treatment dosage corresponding to the calculated $H_2S$ concentration. The calculated treatment dosage can be output by the controller 10 for automatically controlling a supply pump 15 to administer the calculated treatment dosage or outputting instructions to a user (e.g., via a user interface) to adjust the treatment dosage.

The feedback parameter(s) may be measured on-line, downstream of the wet well lift station, for example in by a sensor in a manhole M or by a sensor SC at a location at or near a site of a scrubber 16. As shown in FIG. 3, measured parameters may include a concentration of $H_2S(g)$ or $H_2S(l)$, a pH of the wastewater stream, a flow of the wastewater stream, and a wind speed of the atmosphere above the wastewater.

Feedback parameters may also include parameters measured in a laboratory 12. For example, parameters measured in a laboratory 12 may include a concentration of iron, a concentration of $SO_4^{2-}$ or another sulfate concentration of the wastewater stream, and BOD of the wastewater stream. An abundance of free iron in the wastewater stream is indicative of overdosing of the treatment $FeCl_3$. An abundance of a sulfate concentration is indicative that the anaerobic bacteria have not used the sulfate to generate $H_2S$.

The measured feedback parameter(s) can be evaluated to adjust the treatment dosage accordingly. For example, the controller 10, which is configured to receive the measured feedback parameter(s), can be configured to evaluate the measured parameter(s) by the deterministic mathematical model, the data analytics mathematical model, or a combination thereof and calculate a $H_2S$ concentration. Then controller may calculate a treatment dosage corresponding to the calculated $H_2S$ concentration. The calculated treatment dosage can be output by the controller 10 for automatically controlling a supply pump 15 to administer the calculated treatment dosage or outputting instructions to a user (e.g., via a user interface) to adjust the treatment dosage.

Measured feedback or feed forward parameters may be chosen from amongst parameters already being measured in a wastewater system. The parameters selected for use in a mathematical model are not limited to those described and any combination of parameters may be utilized. Additional parameters may be included for greater accuracy and robustness of the model, leading to a more accurate prediction or determination of the $H_2S$ concentration. Thus, the controller 10 may be retrofitted onto an existing wastewater system and utilize pre-existing sensors to predict or determine the $H_2S(g)$ concentration or the $H_2S(l)$ concentration and determine a treatment dosage.

When predicting or determining the $H_2S$ concentration, the controller 10 may utilize the feed forward parameters, feedback parameters, or a combination thereof. Once the $H_2S$ concentration is predicted or determined by the controller 10, the controller 10 may compare the predicted or determined concentration to a target amount or range or threshold. If the predicted or determined $H_2S$ concentration exceeds the target amount or range, the controller may determine an adequate minimal amount of treatment that a supply pump 15 should supply to the wastewater stream to reduce the $H_2S$ concentration to within or below the target amount or range. If the predicted or determined $H_2S$ concentration is within or below the target amount or range, the controller 10 may repeat the process until the predicted or determined $H_2S$ concentration exceeds the target amount or range.

The controller 10 may also enable proactive maintenance and of $H_2S$ monitoring equipment, such as the sensors measuring various parameters, and/or a scrubber 16. The scrubber 16 may remove $H_2S$ in the wastewater or in a gaseous phase above the wastewater before the wastewater enters the treatment plant 30. The measured feed forward and/or feedback parameters may be utilized to predict or determine a concentration of $H_2S$ at a location at or immediately before any monitoring equipment and/or the scrubber 16. A more accurate prediction or determination of $H_2S$ at the location of the monitoring equipment or scrubber 16 enables a better prediction or determination of abrasive conditions of the equipment or scrubber 16. In addition, it enables a more accurate estimation of $H_2S$ being removed by the scrubber 16. This enables better prediction of maintenance and scheduling of downtime of the equipment or scrubber 16.

Figure 4:
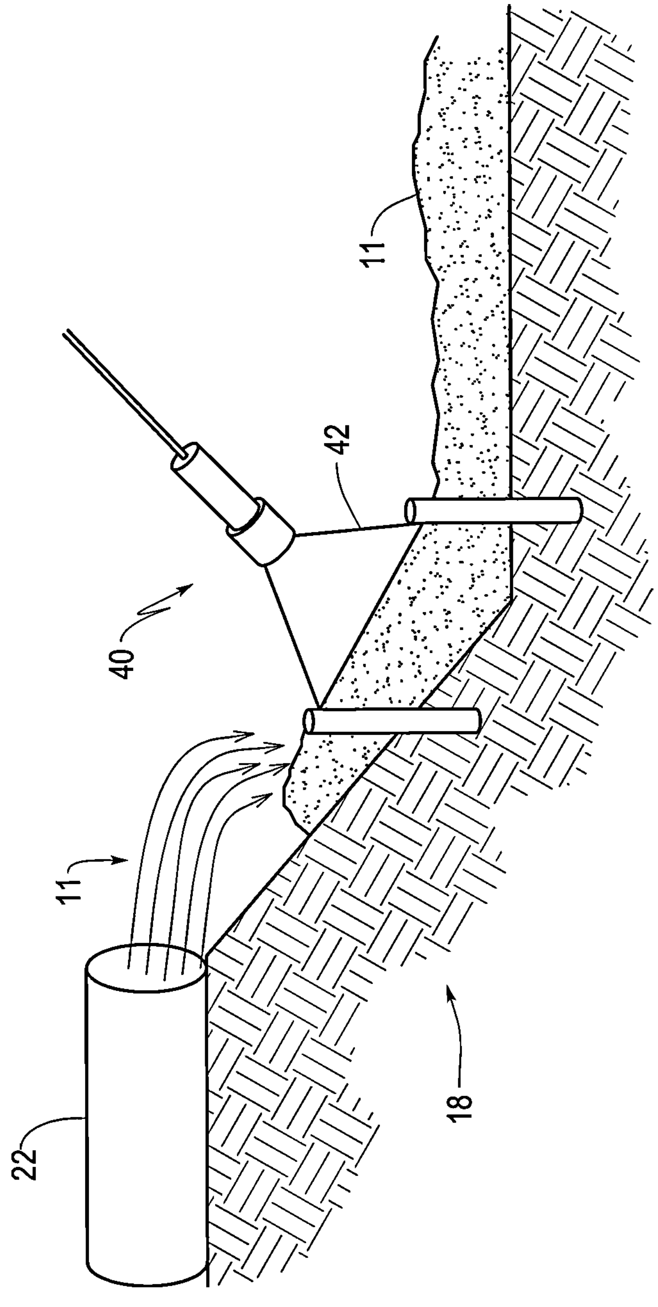
FIG. 4 is a schematic diagram illustrating a probe for validating accuracy of a calculated concentration $H_2S(g)$ in a gaseous phase above the wastewater stream.

Verification and/or adjustment of the mathematical models may be continuously or periodically performed using the real time feedback measurement(s), for example with a $H_2S$ probe 40 shown in FIG. 4. Other continuous on-line feedback measurements or laboratory analysis of samples collected for verification and adjustment of the model may be used.

The probe 40 is located at a discharge site of the force main 22. The probe 40 includes a $H_2S$ sensor and sensor holder attached to a hood 42, configured to capture $H_2S$ gas in a controlled environment above a wastewater stream 11 in a sewer collection channel 18. The probe 40 may include an air inlet and a fan/pump for a controlled gas flow.

The probe 40 may provide a measured concentration of $H_2S(g)$. The measured concentration may be sent to the controller 10, and the controller 10 may compare the predicted or determined $H_2S(g)$ concentration to the concentration measured by the probe 40. The model or combination of models utilized by the controller 10 may be adjusted to match the $H_2S(g)$ concentration measured by the probe 40. For example, additional parameters may be added to or removed from the model or combination of models to adjust the measured or predicted $H_2S$ concentration. In addition or alternatively, variables within the model, such as weighted coefficients, may be adjusted.

The controller 10 can include hardware, such as a circuit for processing digital signals and a circuit for processing analog signals, for example. The controller may include one or a plurality of circuit devices (e.g., an IC) or one or a plurality of circuit elements (e.g., a resistor, a capacitor) on a circuit board, for example. The controller 10 may be a central processing unit (CPU) or any other suitable processor, and can likewise include a plurality of processors, The controller 10 may be or form part of a specialized or general purpose computer or processing system that may implement machine learning algorithms according to disclosed embodiments. One or more controllers, processors, or processing units, memory, and a bus that operatively couples various components, including the memory to the controller, may be used. The controller 10 may include a module that performs the methods described herein. The module may be programmed into the integrated circuits of the processor, or loaded from memory, storage device, or network or combinations thereof. For example, the controller 10 may execute operating and other system instructions, along with software algorithms, machine learning algorithms, computer-executable instructions, and processing functions. In some embodiments, the controller may be a series or a plurality of controllers.

The controller may 10 be operational with numerous other general purpose or special purpose computing system environments or configurations. Examples of well-known computing systems, environments, and/or configurations that may be suitable for use with the disclosed embodiments may include, but are not limited to, personal computer systems, server computer systems, thin clients, thick clients, handheld devices, such as tablets and mobile devices, laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Various components of the treatment system may be connected with each other via any type of digital data communication such as a communication network. Data may also be provided to the controller 10 through a network device, such as a wired or wireless Ethernet card, a wireless network adapter, or any other device designed to facilitate communication with other devices through a network. The network may be, for example, a Local Area Network (LAN), Wide Area Network (WAN), and computers and networks which form the Internet. The system may exchange data and communicate with other systems through the network. For example, the method may be practiced in clouding computing environments, including public, private, and hybrid clouds. The method can also or alternatively be practiced in distributed cloud computing environments where tasks are performed by remote processing devices that are linked through a communications network. In a distributed cloud computing environment, program modules may be located in both local and remote computer system storage media including memory storage devices. The system may be also be configured to work offline.

The present disclosure may further relate to a non-transitory computer-readable storage medium configured to store a computer-executable program that causes a computer to perform functions, such as those for implementing the disclosed methods and models. The computer-readable storage medium may further store the real time data collected by the controller 10 and computer-executable instructions.

The storage medium may include a memory and/or any other storage device. The memory may be, for example, random-access memory (RAM) of a computer. The memory may be a semiconductor memory such as an SRAM and a DRAM. The storage device may be, for example, a register, a magnetic storage device such as a hard disk device, an optical storage device such as an optical disk device, an internal or external hard drive, a server, a solid-state storage device, CD-ROM, DVD, other optical or magnetic disk storage, or other storage devices.

It will be appreciated that the above-disclosed features and functions, or alternatives thereof, may be desirably combined into different methods and systems. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A method for controlling a hydrogen sulfide concentration of a wastewater stream, the method comprising:

measuring, with a liquid phase concentration of hydrogen sulfide of the wastewater stream;

calculating a gas phase concentration of hydrogen sulfide of the wastewater stream with a mathematical model that characterizes the gas phase concentration of hydrogen sulfide based on a set of variables that includes (i) the measured liquid phase concentration of hydrogen sulfide; and (ii) the measured at least one additional parameter;

based on the calculated gas phase concentration of hydrogen sulfide, determining a treatment dosage of a treatment agent that reduces the hydrogen sulfide concentration of the wastewater stream; and applying the determined treatment dosage of the treatment agent to the wastewater stream.

2. The method of claim 1, wherein the mathematical model includes a deterministic model that is based on (i) a theoretical relationship between the measured at least one additional parameter and the gas phase concentration of hydrogen sulfide; and (ii) a theoretical relationship between the liquid phase concentration of hydrogen sulfide and the gas phase concentration of hydrogen sulfide.

3. The method of claim 1, wherein the mathematical model includes an empirical model that is based on correlations of (i) empirical data of the measured at least one additional parameter and the gas phase concentration of hydrogen sulfide; and (ii) empirical data of the liquid phase concentration of hydrogen sulfide and the gas phase concentration of hydrogen sulfide.

4. The method of claim 2, wherein the deterministic model is also based on correlations of empirical data of the measured at least one additional parameter and the gas phase concentration of hydrogen sulfide.

5. The method of claim 2, wherein the deterministic model is also based on correlations of empirical data of the liquid phase concentration of hydrogen sulfide and the gas phase concentration of hydrogen sulfide.

6. The method of claim 1, wherein the step of determining the treatment dosage includes comparing the calculated gas phase concentration of hydrogen sulfide to a predetermined threshold value of hydrogen sulfide concentration.

7. The method of claim 1, wherein the measured at least one additional parameter of the wastewater stream includes from 2 to 8 measured parameters of the wastewater stream.

8. The method of claim 1, wherein the measured at least one additional parameter of the wastewater stream includes from 3 to 5 measured parameters of the wastewater stream.

9. The method of claim 7, wherein the measured at least one additional parameter of the wastewater stream includes at least two of: (i) a temperature of the wastewater; (ii) a pH of the wastewater; (iii) biochemical oxygen demand of the wastewater; (iii) a concentration of a hydrogen sulfide treatment agent in the wastewater; (iv) an oxygen concentration in the wastewater; and (v) a sulfate concentration in the wastewater.

10. The method of claim 9, wherein the measured at least one additional parameter of the wastewater stream further includes at least one of: (vi) a flow rate of the wastewater; (vii) a turbidity of the wastewater; (viii) a total organic carbon content of the wastewater; (ix) an ultraviolet adsorption of the wastewater; (x) a total suspended solids content of the wastewater; (xi) a zeta potential of the wastewater; (xii) a conductivity of the wastewater; (xiii) a hardness of the wastewater; and (xiv) an oxidation-reduction potential of the wastewater.

11. The method of claim 1, wherein the set of variables further includes at least one known parameter of the wastewater stream.

12. The method of claim 11, wherein the at least one known parameter of the wastewater stream includes at least one of (i) a slope of the wastewater stream; (ii) a mean velocity of the wastewater stream; and (iii) a hydraulic depth of the wastewater stream.

13. A method for controlling a hydrogen sulfide concentration of a wastewater stream, the method comprising:

measuring, with a sensor, a liquid phase concentration of hydrogen sulfide of the wastewater stream;

measuring, with a sensor, at least one additional parameter of the wastewater stream;

calculating a gas phase concentration of hydrogen sulfide of the wastewater stream with a mathematical model that characterizes the gas phase concentration of hydrogen sulfide based on a set of variables that includes (i) the measured liquid phase concentration of hydrogen sulfide; and (ii) the measured at least one additional parameter; and based on the gas phase concentration of hydrogen sulfide, taking at least one corrective action on a hydrogen sulfide gas scrubber that is configured to remove hydrogen sulfide from the wastewater stream.

14. The method of claim 13, wherein the at least one corrective action includes changing a downtime schedule or a maintenance schedule of the hydrogen sulfide gas scrubber.

* * * * *